United States Patent [19]
Ketch

[11] Patent Number: 5,472,029
[45] Date of Patent: Dec. 5, 1995

[54] SAW GUIDE

[76] Inventor: Andrew D. Ketch, 2790 Ortona Road, Duncan, British Columbia, Canada, V9L-3W8

[21] Appl. No.: 287,644

[22] Filed: Aug. 9, 1994

[51] Int. Cl.⁶ .................................................. B27M 1/00
[52] U.S. Cl. .......................... 144/371; 30/286; 33/418; 33/456; 83/745; 83/522.25; 144/144 R; 144/372; 144/144.5 R
[58] Field of Search .............................. 33/403, 418, 430, 33/456, 495, 767; 30/286; 83/468.3, 522.25, 524, 745, 767; 144/134 R, 134 D, 136 C, 137, 144 R, 144.5, 371, 372

[56] References Cited

U.S. PATENT DOCUMENTS

| | | | |
|---|---|---|---|
| 2,926,706 | 3/1960 | Hopla | 83/486.1 |
| 3,263,714 | 8/1966 | Martinson | 30/286 |
| 3,738,211 | 6/1973 | Carter | 83/468.3 |
| 4,054,077 | 10/1977 | Gram | 83/745 |
| 4,724,853 | 5/1988 | Davison | 144/144.5 R |
| 4,905,745 | 3/1990 | Jaeger | 144/134 |
| 5,040,581 | 8/1991 | Takashima | 144/144.5 R |
| 5,226,345 | 7/1993 | Gamble | 83/745 |
| 5,271,159 | 12/1993 | Chen et al. | 33/403 |

*Primary Examiner*—W. Donald Bray
*Attorney, Agent, or Firm*—Foley & Lardner

[57] ABSTRACT

The invention provides a saw guide for a power saw or router of the type having a blade and a saw housing wider than the blade which directly overlies the blade during cutting. The saw guide includes a guide bar having a straight outer edge for guiding a peripheral guide surface of the saw housing, a gauge bar having a straight outer edge, and a hinge pivotally connecting the gauge bar to the guide bar. The gauge bar can be swung manually from a position in which the gauge bar and guide bar lie parallel on top of a flat workpiece to a position where the hinge and gauge bar are clear of the straight outer edge of the guide bar so that the saw can move without obstruction along the straight outer edge of the guide bar.

14 Claims, 3 Drawing Sheets

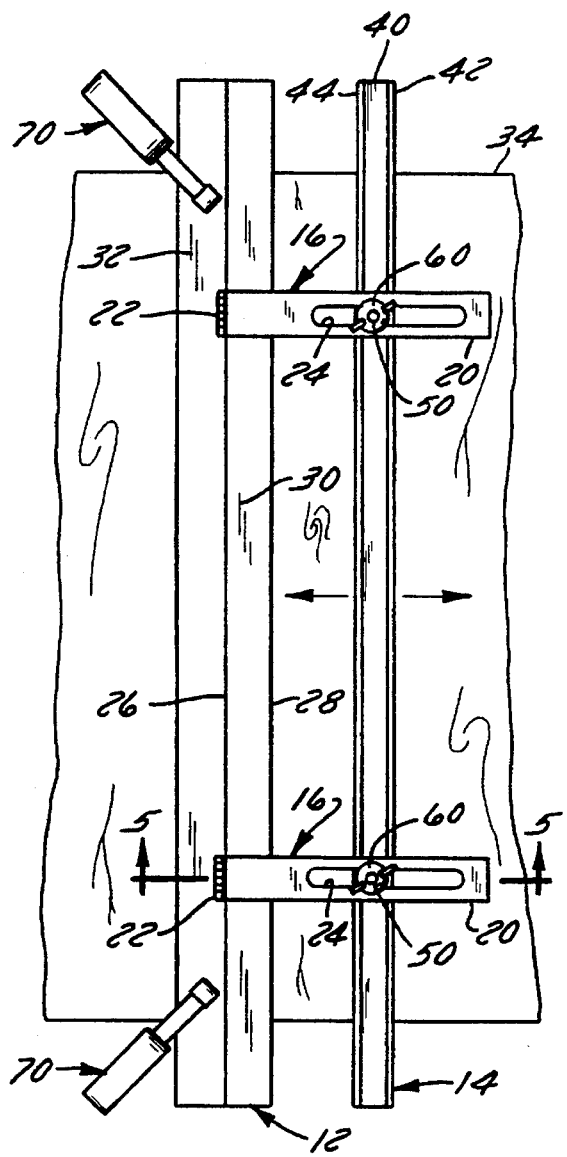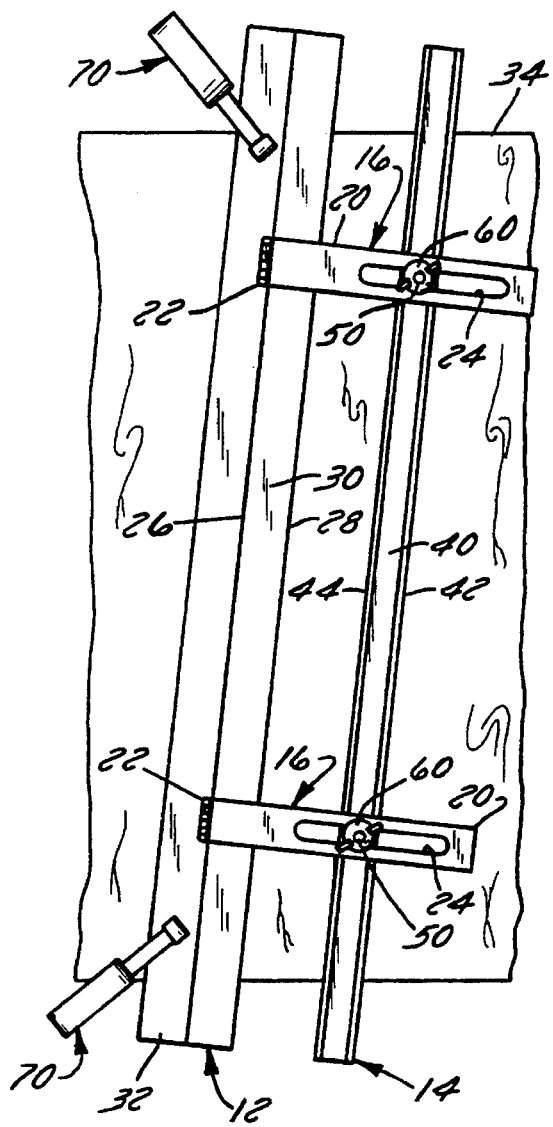
FIG. 3    FIG. 4
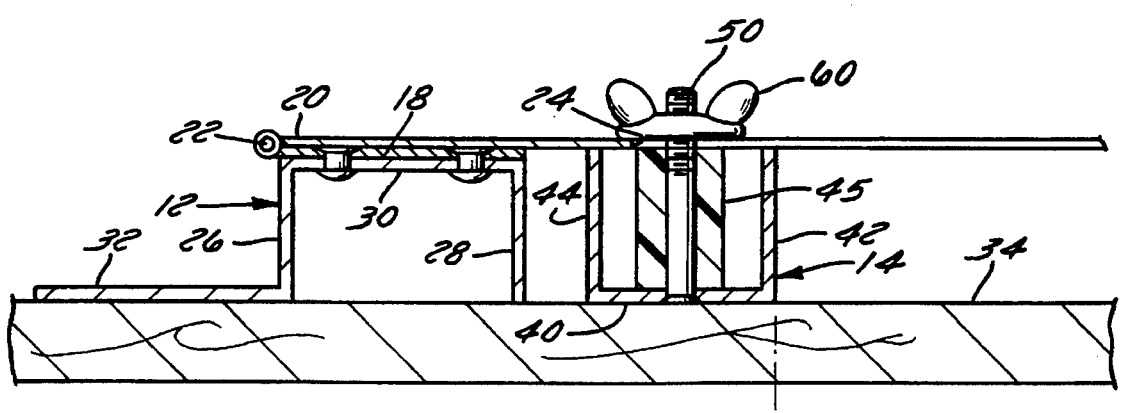
FIG. 5

SAW GUIDE

FIELD OF THE INVENTION

This invention relates to a saw guide assembly which is useful for guiding hand-held power saws or routers, and more particularly to a guide assembly which can be set to accommodate various types of saws and routers.

BACKGROUND OF THE INVENTION

A well-known difficulty encountered in guiding hand-held power saws while cutting wood or like materials is holding the saw so that an accurate, smooth cut is made in the workpiece. The uncertainty and errors in the process of accurately locating the position of the blade of a circular saw in the absence of a guide of some type are well known. The difficulty arises from the lack of a device for identifying the cutting position of the blade on the board to be cut, and also to the differences in the various brands of cutting tools.

Typical guides of the type contemplated herein are shown in U.S. Pat. No. 4,054,077, issued on Oct. 18, 1977, entitled "Guide For Hand Held Power Saws, " U.S. Pat. No. 2,926,706, issued on Mar. 1, 1960, entitled "Cross-Cut and Rip Guide Device for Portable Power Saws," and U.S. Pat. No. 5,271,159, issued on Dec. 21, 1993, entitled "Circular Saw Guide." In each of these devices, the guide must be aligned in a spaced relation to the contemplated cut to allow for the distance between the saw and the edge of the flange on the saw. In the Hopla U.S. Pat. No. 2,926,706, a sight guide is provided to align the saw blade in a spaced relation to the guide.

SUMMARY OF THE INVENTION

The invention provides a saw guide for a power saw or router of the type having a blade and a saw housing wider than the blade which directly overlies the workpiece during cutting. The saw guide includes a guide bar having a straight outer edge configured for guiding a peripheral guide surface of the saw housing, a gauge bar having a straight outer edge, and a hinge pivotally connecting the gauge bar to the guide bar. When the respective straight edges are in parallel with each other, the gauge bar can be swung manually from a position in which the gauge bar and guide bar lie parallel on top of a flat workpiece to a position where the hinge and gauge bar swing clear of the straight outer edge of the guide bar. With the gauge bar swung away, the saw can move without obstruction along the straight outer edge of the guide bar.

A device for adjusting the spacing between the guide bar and the gauge bar may be provided to adapt the guide to particular saws, or the hinge may be designed with a predetermined standard saw spacing. In a preferred embodiment, each hinge includes a slot for matingly engaging a screw mounted on each end of the gauge bar. A wing nut is provided on each of the screws to allow for the adjustment of the bar with respect to the guide bar.

The invention provides a method for cutting a generally flat workpiece such as a board using a saw guide assembly and a power saw or router as described above. The method involves first placing the saw guide on the workpiece with the gauge bar swung to a down position so that the gauge bar and guide bar lie parallel on top of the workpiece. The straight outer edge of the gauge bar is positioned to coincide with a cut to be made in the workpiece. The guide bar is then removably secured to the workpiece, and the gauge bar is swung clear of the straight outer edge of the guide bar. The workpiece is then cut with the saw blade while sliding the saw housing along the straight outer edge of the guide bar, after which the saw guide is removed from the workpiece and repositioned for another cut at a different location. If necessary, the spacing between the guide bar and gauge bar is first adjusted to equal a distance by which the saw blade is offset from a saw guide surface on the side of the saw housing.

In a preferred form of this method, the guide bar is secured to a board by a pair of clamps in a position to engage the flange of a saw or router. The gauge bar is pivoted away from the board. The flange on a saw or router is then aligned with the guide bar and a cut is made across the end of the board, The gauge bar is then pivoted into engagement with the board and aligned with the end of the board, e.g., by loosening the wing nuts on the screws. The wing nuts are then reset to secure the bar to the hinge plates on the guide bar. Once the gauge bar has been secured to the hinge plate, the width of the flange on the saw or router is established. After the distance between the guide bar and the gauge bar has been set, the operator draws a line on the board to be cut. The guide assembly is placed on the board with the gauge bar aligned with the line, and the guide bar is secured to the board by the clamps. The gauge bar is then pivoted away from the board. The guide bar which automatically aligns the saw with the line to be cut.

To make a dado cut according to the method of the invention, the saw used is a router of the type that cuts a groove in a workpiece as it moves linearly. The dado cut is made first performing the foregoing steps along a first line using the router to form a partial groove in the workpiece. The method of the invention is then repeated on the opposite side of the first line along a second line parallel to and spaced from the first line using the router to enlarge the partial groove in the workpiece.

One of the primary advantages of the saw guide of the invention is that, once the distance between the gauge bar and gauge has been set for a specific saw or router, it can be used for any number of times for aligning the saw or router with a workpiece. Other features and advantages of the invention will become apparent to those skilled in the art upon review of the following drawings, the detailed description and the appended claims.

BRIEF DESCRIPTION OF THE DRAWING

In the accompanying drawing, wherein like numerals denote like elements:

FIG. 3 is a top view of the clamp plate guide assembly clamped to a workpiece;

FIG. 4 is a view of the guide assembly shown aligned at an angle to a board;

FIG. 5 is a sectional view taken along line 5—5 of FIG. 3 showing the bar aligned with a line drawn on the workpiece;

DETAILED DESCRIPTION OF THE PREFERRED EMBODIMENTS

Figure 1:
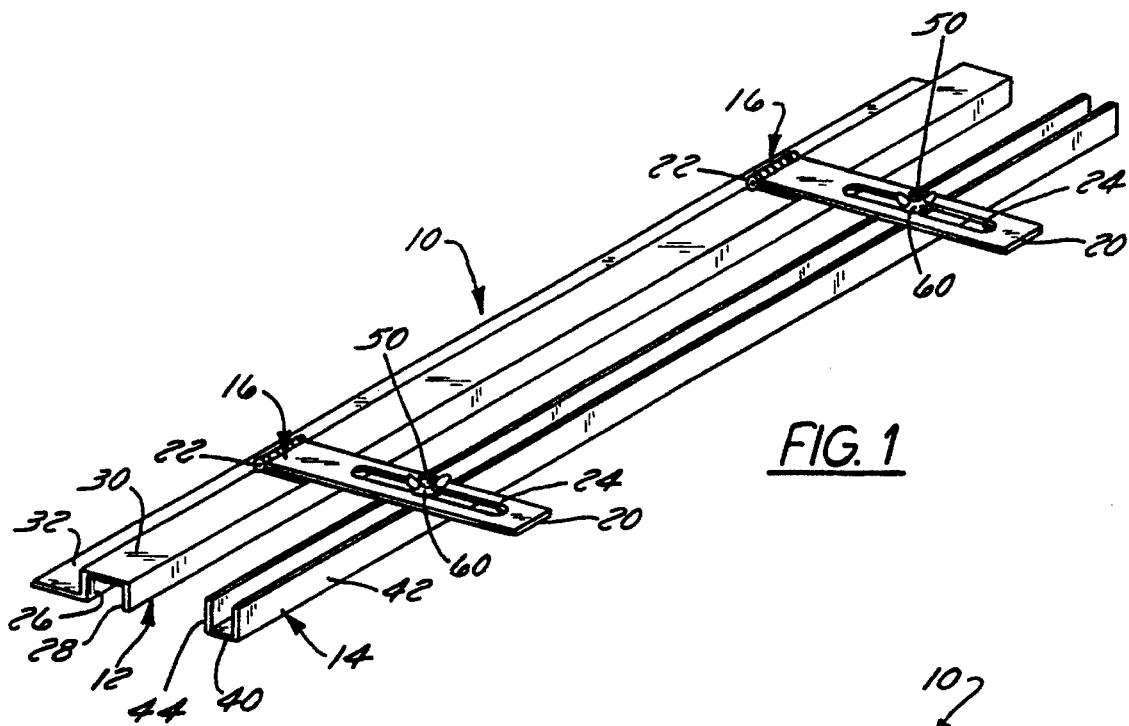
FIG. 1 is a perspective view of the guide assembly according to the present invention.
Figure 2:
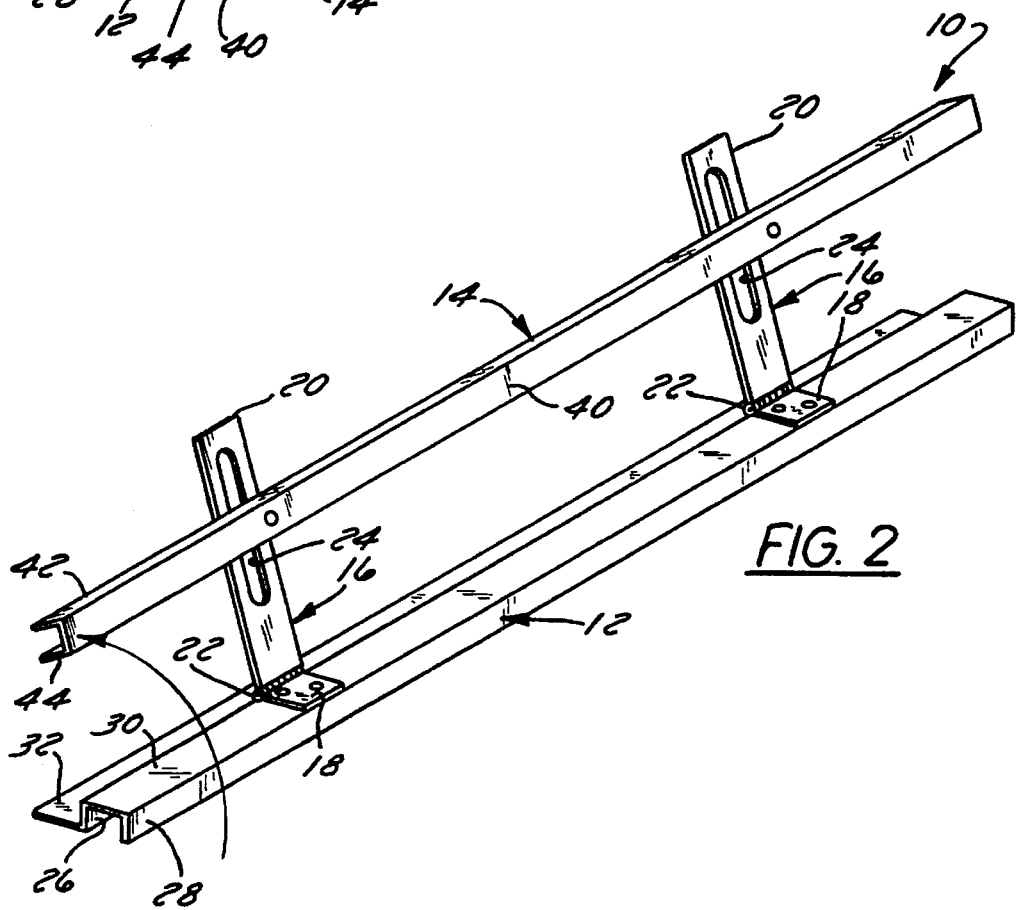
FIG. 2 is a view similar to FIG. 1 showing the gauge bar pivoted away from the workpiece.

Referring to FIGS. 1 to 5, a saw guide 10 according to the invention generally includes a guide bar 12, a gauge bar 14 and a pair of hinge assemblies 16 for pivotally mounting the gauge bar 14 on the guide bar 12. Guide bar 12 has a vertical back wall 26 and a vertical front wall 28 interconnected by a top wall 30. A horizontal flange 32 is provided at the bottom of back wall 26 for securing guide bar 12 to a workpiece 34 such as a wooden board. Guide bar 12 is conveniently secured to workpiece 34 by a pair of manual spring clamps 70 as shown, but other conventional fastening devices, such as adjustable C-clamps or vise-grips, may also be used for this purpose.

Gauge bar 14 may be U-shaped as shown, with a horizontal base wall 40 and upright parallel side walls 42, 44 extending from each side of wall 40. Outer side wall 42 provides a measuring surface for aligning the gauge bar with a cut or line drawn across a workpiece. Wall 44 may be omitted if desired, such that bar 14 is L-shaped in cross section, but is preferably included in order to support hinge assemblies 16 evenly. A pair of countersunk screws or bolts 50 are mounted on the underside of wall 40 in a generally parallel relation to each other and to side walls 42 and 44. Spacers 45 may be provided on the portions of bolts 50 that extend through bottom wall 40 into the inside of bar 14.

Each hinge assembly 16 includes a base plate 18 mounted on top wall 30 of guide bar 12, and a pivot plate 20 pivotally connected to the base plate 18 by a hinge 22. Each pivot plate 20 includes a slot 24 which is elongated in the lengthwise direction of pivot plate 20. The slots 24 in plates 20 are aligned parallel to each other. Gauge bar 14 is releasably secured to hinge assemblies 16 by wing nuts 60 threadedly secured on bolts 50. As shown in FIG. 5, nuts 60 clamp each pivot plate 20 along the sides of slot 24 against the upper end of spacer 45 and the upper edges of walls 42, 44. If a square bar having a top wall is used as gauge bar 14, spacer 45 could be omitted. Similarly, other mechanical adjustable spacing devices could be used in place of slots 24 and screws 50. For example, telescoping arms could be provided in place of plates 20. Although a single hinge assembly 16 could be used, a pair of hinge assemblies 16 located near opposite ends of bars 12, 14 is preferred because such an arrangement provides more accuracy than use of a single, centrally located hinge.

Figure 6:
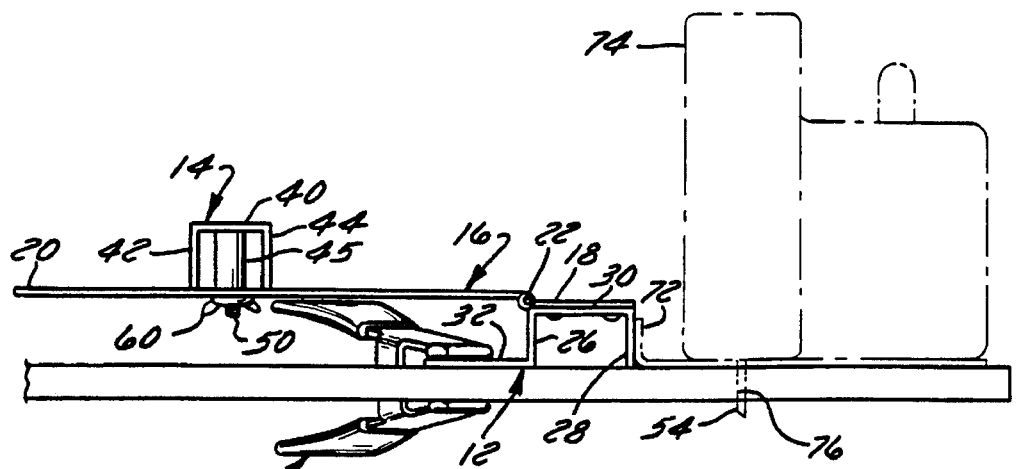
FIG. 6 is a cross sectional view of the clamp plate with the bar pivoted away from the workpiece and a saw aligned with the clamp plate to make the first cut.
Figure 7:
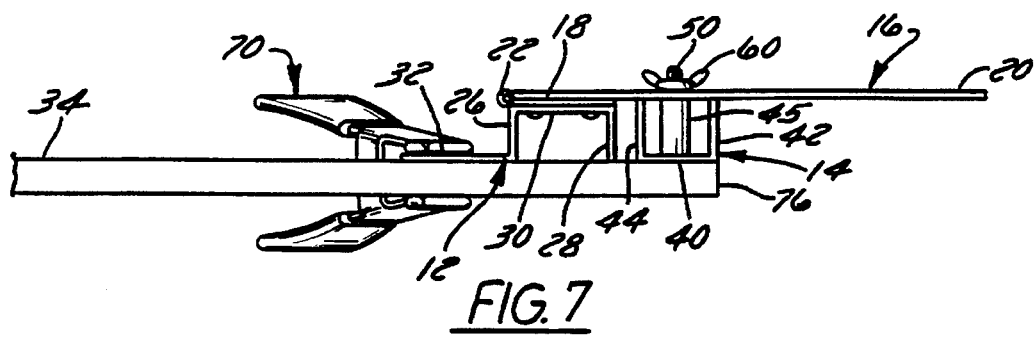
FIG. 7 is a view showing the gauge bar aligned with the first cut.

In use, flange 32 is secured to the workpiece 34 in a spaced relation to the end of the workpiece by a clamps 70 as shown in FIG. 6. A guide flange 72 of a saw or a router 74 is aligned with front wall 28 of guide bar 12 in contact therewith, as shown in FIG. 6, such that the edge or face of wall 28 guides the saw during cutting. A cut 76 is made across the workpiece. The distance of cut 76 from the surface of the wall 28 establishes the distance between the face of the flange on the saw and the surface of saw blade 54. The saw is then removed, and gauge bar 14 is swung into engagement with the workpiece and adjusted by loosening the wing nuts 60 to move the face of side wall 42 of gauge bar 14 into alignment with the cut end 76 of the workpiece as shown in FIG. 7. This establishes the distance between the flange on the saw and the surface of the saw. For this purpose, gauge bar 14 is preferably approximately the same length as guide bar 12, since gauge bar 14 will be used as a straight edge to draw a line across the entire workpiece, and not merely as a sighting device.

Figure 8:
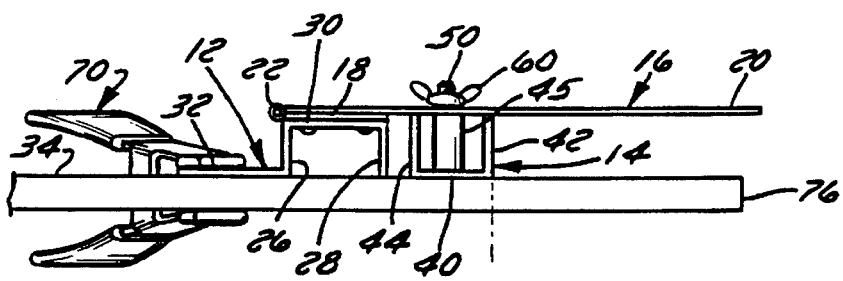
FIG. 8 is a view showing the gauge bar aligned with a new cut line.

After establishing the spacing of the guide flange or side edge of the saw or router, saw guide 10 is then used to accurately locate and guide the saw or router. This is done by drawing a line for the desired cut, which can be across a workpiece (FIG. 3) or board or at an angle (see FIG. 4). Saw guide 10 is placed on the board as shown in FIG. 8 with the front wall 28 of gauge bar 14 aligned with the line drawn on the workpiece. Guide bar 12 is then clamped in position to the board by clamps 70.

Figure 9:
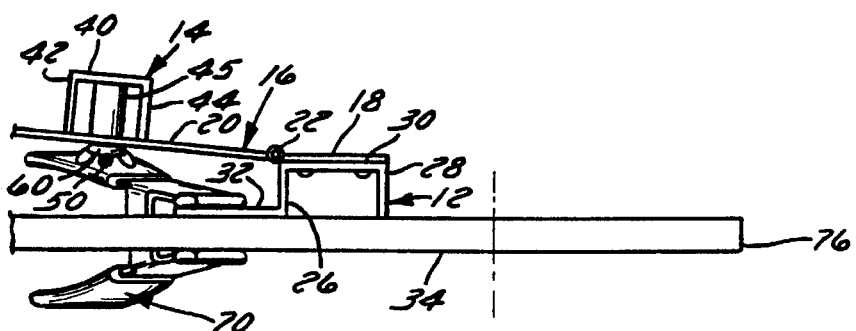
FIG. 9 is a view showing the gauge bar pivoted away from the cut line with the saw guide positioned to guide the saw.

Gauge bar 14 is then pivoted away from the workpiece as shown in FIG. 9. The flange 72 on the saw or router is aligned in contact with vertical wall 28 on guide bar 12, and then moved across the board with the flange 72 sliding against the outside of wall 28, thereby completing the desired cut.

The saw guide of the invention is particularly useful in making a dado cut, i.e., a linear groove having a width slightly greater than the thickness of the edge of a second piece of wood to be mounted in the groove at an angle to the workpiece. To make a dado cut using the saw guide of the invention, the foregoing procedure is carried out along a line using a router that forms a partial groove on the first pass. The router blade has a diameter which is less than the desired width of the groove. A second line is therefore drawn parallel to the first line on the opposite side of the partial groove from the first line. The spacing between the first and second lines equals the desired thickness of the groove. The procedure for using the saw guide of the invention is then repeated again so that the router travels along the second line, completing the cutting of the groove. If the groove is to be wider than twice the diameter of the router blade, three or more repetitions of the cutting steps may be needed.

A saw guide according to the invention has a number of advantages over prior saw guide devices. It is self-aligning and does not require the user to make manual offset measurements each time a cut is to be made. Guide 10 also can be positioned as needed to make angular cuts and does not have to be aligned with or attached to a straight edge of the workpiece. It is simple to use; there are no dials or other pieces to adjust once the guide has been set for a particular saw, and it can be used, removed and then used again without readjustment.

Although the invention has been described in conjunction with specific embodiments, many alternatives and variations will be apparent to those skilled in the art. The gauge bar could, for example, comprise a simple vertical plate instead of a U-shaped or square bar, the plate having one or more right-angle extensions provided with slots alignable with slots 24. Nut and bolt assemblies would then be used to secure the gauge bar extensions directly to pivot plates 20. Such alternatives and variations fall within the broad scope of the appended claims.

I claim:

1. A guide for a power saw or router of the type having a blade and a housing wider than the blade which directly overlies the blade during cutting, comprising:

a guide bar having a straight outer edge configured for guiding a peripheral edge of the saw housing;

a gauge bar having a straight outer edge, which gauge bar is approximately as long as the guide bar;

a hinge pivotally connecting the gauge bar to the guide bar so that the respective straight edges are in parallel with each other, and the gauge bar can be swung manually from a position in which the gauge bar and guide bar lie in parallel on top of a flat workpiece to a position where the hinge and gauge bar are clear of the straight outer edge of the guide bar so that the saw or router can move without obstruction along the straight outer edge of the guide bar; and means for adjusting the spacing between the guide bar and the gauge bar.

2. The guide assembly according to claim 1, wherein the hinge assembly includes a base plate mounted on the guide bar, a pivot plate connected to the gauge bar, and a hinge connecting the pivot plate to the base plate.

3. The guide assembly according to claim 2, wherein the adjustment means comprises an elongated, lengthwise slot in the pivot plate and an adjustable fastener interconnecting the pivot plate to the guide bar, which fastener extends through the slot.

4. The guide assembly according to claim 3, wherein the fastener comprises:

a bolt extending through a hole in the gauge bar and retained therein by its head, and a threaded end which extends through the slot in the pivot plate, and a nut threadedly mounted on the threaded end of the screw in a position for releasably clamping the pivot plate against an upper end of the gauge bar.

5. The guide assembly of claim 1, further comprising a pair of the hinge assemblies located near opposite ends of the guide and gauge bars.

6. The guide assembly of claim 1, wherein the straight outer edge of the guide bar comprises an elongated, rectangular vertical guide wall having sufficient height to securely engage a vertical guide flange of the saw.

7. The guide assembly of claim 6, wherein the guide bar further has a horizontal flange extending along the side thereof opposite the vertical guide wall.

8. The guide assembly of claim 1, further comprising means for removably securing the guide bar to the workpiece.

9. The guide assembly of claim 8, wherein the means for removably securing the guide bar to the workpiece comprises a pair of spring clamps.

10. The guide assembly of claim 7, further comprising a pair of spring clamps for removably securing the horizontal flange of the guide bar to the workpiece.

11. A method for cutting a generally flat workpiece using a guide assembly for guiding a power saw or router of the type having a blade and a housing wider than the blade which directly overlies the blade during cutting, guide assembly comprising a guide bar having a straight outer edge configured for guiding a peripheral guide surface of the housing, a gauge bar having a straight outer edge, and a hinge pivotally connecting the gauge bar to the guide bar so that the respective guide bar and gauge bar are in parallel with each other, the method comprising the steps of:

(a) placing the guide assembly on the workpiece with the gauge bar swung to a position wherein the gauge bar and guide bar lie in a parallel relation on top of the workpiece;

(b) positioning the straight outer edge of the gauge bar to coincide with a cut to be made in the workpiece;

(c) removably securing the guide bar to the workpiece;

(d) swinging the gauge bar clear of the guide bar;

(e) cutting the workpiece while sliding the housing along the straight outer edge of the guide bar; and (f) removing the guide assembly from the workpiece.

12. The method of claim 11, including the step of adjusting the spacing between the guide bar and the gauge bar to equal the distance by which the blade is offset from a guide surface on the housing.

13. The method of claim 12, wherein the adjusting step further comprises:

placing the guide on an adjustment workpiece with the gauge bar swung to a position where the gauge bar is clear of the straight outer edge of the guide bar;

securing the guide bar from movement relative to the adjustment workpiece;

cutting the adjustment workpiece with the blade while sliding the guide surface of the housing along the straight outer edge of the guide bar to form a cut in the adjustment workpiece at a position offset from the straight outer edge of the guide bar;

swinging the gauge bar to a position wherein the gauge bar and guide bar lie in parallel on top of the adjustment workpiece; and aligning the straight outer edge of the gauge bar with the cut in the adjustment workpiece by adjusting the spacing between the gauge bar and the guide bar.

14. The method of claim 11, wherein the router is of the type that cuts a groove in a workpiece as it moves linearly, and the method further comprises forming a dado cut in the workpiece by the steps of:

performing steps (a) to (f) along a first line using the router to form a partial groove in the workpiece;

then repeating steps (a) to (f) on the opposite side of the first line along a second line parallel to and spaced from the first line using the router to enlarge the partial groove in the workpiece.

* * * * *